United States Patent
Nobis et al.

(10) Patent No.: US 10,359,612 B2
(45) Date of Patent: Jul. 23, 2019

(54) MICROSCOPICAL IMAGING SYSTEM (71) Applicant: Carl Zeiss Microscopy GmbH, Jena (DE)

(72) Inventors: Thomas Nobis, Jena (DE); Joerg Petschulat, Jena (DE); Wolfgang Singer, Aalen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 599 days.

(21) Appl. No.: 14/835,008

(22) Filed: Aug. 25, 2015

(65) Prior Publication Data

US 2016/0062111 A1  Mar. 3, 2016

(30) Foreign Application Priority Data

Aug. 26, 2014  (DE) .................. 10 2014 112 199

(51) Int. Cl.
*G02B 21/02* (2006.01)
*G02B 13/00* (2006.01)
(Continued)

(52) U.S. Cl.
CPC ....... *G02B 21/025* (2013.01); *G02B 13/0095* (2013.01); *G02B 21/361* (2013.01); *G02B 26/06* (2013.01)

(58) Field of Classification Search
None
See application file for complete search history.

(56) References Cited

U.S. PATENT DOCUMENTS 6,095,651 A    8/2000 Williams et al.
7,633,053 B2  12/2009 Wolleschensky et al.
(Continued)

FOREIGN PATENT DOCUMENTS

DE   10227120 A1    3/2004
JP   09-274137 A   10/1997
(Continued)

OTHER PUBLICATIONS

German Search Report, Application No. 102014112199.6, dated May 6, 2015, 7 pages total.
(Continued)

*Primary Examiner* — Darryl J Collins
*Assistant Examiner* — Journey F Sumlar
(74) *Attorney, Agent, or Firm* — Patterson Thuente Pedersen, P.A.

(57) ABSTRACT

A microscopical imaging system for the widefield microscopical imaging of a sample. The imaging system includes a ray path with an objective, a tube lens system arranged behind the objective as seen from the sample, and a relay optical system with an objective-side component and an image-side component. The objective-side component includes at least one first objective-side lens group and a second objective-side lens group. The image-side component includes at least one first image-side lens group and a second image-side lens group. The relay optical system transfers an image of the exit pupil of the objective to a pupil plane between the objective-side component and the image-side component. The relay optical system transfers an image of the sample from an intermediate image plane to an image plane. The imaging system includes an adaptive optical element that is arranged at the pupil plane between the objective-side component and the image-side component.

15 Claims, 7 Drawing Sheets (51) Int. Cl.
    *G02B 21/36*     (2006.01)
    *G02B 26/06*     (2006.01)

(56) References Cited

U.S. PATENT DOCUMENTS

| | | | |
|---|---|---|---|
| 7,742,213 | B2 | 6/2010 | Potsaid et al. |
| 2003/0230710 | A1 | 12/2003 | Wolleschensky et al. |
| 2007/0109637 | A1* | 5/2007 | Cook ................. G02B 17/0663 359/399 |
| 2007/0253057 | A1 | 11/2007 | Potsaid et al. |
| 2009/0059358 | A1* | 3/2009 | Epple ................. G02B 17/0892 359/366 |
| 2011/0006231 | A1 | 1/2011 | Betzig et al. |
| 2011/0149241 | A1* | 6/2011 | Dai .................... A61F 9/00806 351/205 |

FOREIGN PATENT DOCUMENTS

| | | |
|---|---|---|
| JP | 2001-221952 A | 8/2001 |
| JP | 2008-529082 A | 7/2008 |
| JP | 2010-538328 A | 12/2010 |
| JP | 2012-252037 A | 12/2012 |
| JP | 2013-113934 A | 6/2013 |
| JP | 2014-521122 A | 8/2014 |
| WO | WO 2006/081031 A2 | 8/2006 |
| WO | WO 2013/010151 A1 | 1/2013 |

OTHER PUBLICATIONS

Japanese Office Action issued in Japanese Patent Application No. 2015-166022 dated Mar. 19, 2019 (5 pgs).

\* cited by examiner

MICROSCOPICAL IMAGING SYSTEM

RELATED APPLICATION

The present application claims priority to German Application No. 102014112199, filed Aug. 26, 2014, said application being hereby fully incorporated herein in its entirety by reference.

FIELD OF THE INVENTION

The invention relates to a microscopical imaging system for the widefield microscopical imaging of a sample. The imaging system comprises a ray path with an objective and a tube lens system arranged behind the objective as seen from the sample. The imaging system further comprises a relay optical system with an objective-side component and an image-side component.

BACKGROUND OF THE INVENTION

To permit field-independent manipulations to be made in the ray path, it is necessary to arrange in the ray path manipulation elements designed for this purpose—e.g., phase plates—at a plane conjugate with the objective pupil. As the back focal lengths of the exit pupils of most objectives are negative, and therefore the exit pupils of the objectives are virtually inside the objective, the objective pupil in conventional one- or two-stage microscopical imaging systems for widefield microscopical imaging of a sample are inaccessible unless a relay optical system is provided.

A microscopical imaging system with a relay optical system permitting targeted pupil manipulation outside the objective is described in U.S. Pat. No. 5,808,791, for example. The relay optical system disclosed there has an objective-side and an image-side component, with a pupil modulator—e.g., a phase plate or a contrast modulation element—being arranged between these components, at a plane on which the objective pupil is imaged. The image-side component may consist of two lens units. The pupil modulation element is a static element.

U.S. Pat. No. 5,959,772 described a relay optical system with variable magnification, i.e. with a zoom function. This system transfers an intermediate image to an image plane, in which a camera may be positioned. The relay optical system consists of five lens groups. A first lens group is focused on the intermediate image and thus collimates the rays coming from there. Three other lens groups together constitute the variable power system, with the two outer groups being displaceable along the optical axis. A fifth lens group finally projects the collimated ray path onto the image plane. Pupil manipulation is not intended in this system.

U.S. Pat. No. 7,952,800 also describes a relay optical system with variable magnification. The relay system disclosed therein transfers a magnified intermediate image to an image plane; at the same time, the system is designed in such a way that zooming changes the positions of the entrance and exit pupils but minimally. The system consists of five lens groups, four of which are arranged on the objective side, i.e. between the objective and a pupil plane within the relay system, and three of these four lens groups can be displaced relative to the others and to each other to ensure the zoom function. A fifth lens group, consisting of a cemented component, is arranged on the image side, i.e. between the pupil plane and the image plane or exit pupil, respectively.

Commonly, such relay systems can only be applied with image fields smaller than those used in widefield microscopy; moreover, they are designed for a narrow spectral range only.

In recent years, furthermore, adaptive elements such as, e.g., membrane mirrors or spatial light modulators (SLMs) have continuously been improved technically, so that now they are generally applicable in commercial widefield microscopy and, in fact, are used for correcting optical aberrations, implementing special contrasting methods and fast focusing, to name but a few examples. One example of this is described in U.S. Pat. No. 7,764,433. To ensure a field-independent effect of the adaptive optical element, it is placed at a pupil plane and can be used, e.g., to correct spherical aberrations as a function of the depth of focus. For this purpose, the adaptive optical element is positioned at a plane that is conjugate with the objective plane, where the position of each light ray depends on the angle of emergence from the sample only. For this purpose, the arrangement described in U.S. Pat. No. 7,764,433 is also provided with a relay optical system, which consists of a single lens each on the objective side and on the image side, between which the adaptive optical element is arranged. In the simplest case, this is a so-called 4f system, with the relay lengths corresponding to twice the two focal lengths of the lenses of the relay optical system.

With such a system, it is not possible, though, to effect comprehensive color correction for large spectral ranges; moreover, chromatic aberrations with regard to the image field cannot be corrected satisfactorily, if at all. Moreover, the system is not designed for the use of reflective adaptive optical elements either, in which an oblique incidence to or exit from the adaptive element may cause further aberrations. Even though an adaptive optical element is employed, color-dependent aberrations will occur if the pupil position for different light colors is attained only with a finite accuracy or if the pupil size is not filled exactly; these aberrations increase in proportion with the size of the field angle, which in widefield microscopy is particularly large.

SUMMARY OF THE INVENTION

Departing therefrom, the problem of the invention is to create a microscopical imaging system that is designed for a large field of view and guarantees achromatic correction of pupil imaging over a wide spectral range.

In a microscopical imaging system of the kind described at the outset which solves this problem, both the objective-side component and the image-side component of the relay optical system comprise at least two lens groups each. In more exact terms, the objective-side component comprises at least a first objective-side lens group and, at a distance from it, a second objective-side lens group, while the image-side component comprises at least a first image-side lens group and, at a distance from it, a second image-side lens group. The relay optical system images the exit pupil of the objective on a pupil plane between the objective-side component and the image-side component; therefore, this pupil plane is conjugate with the exit pupil of the objective. Further, the relay optical system transfers an image of the sample from an intermediate image plane to an image plane. At the image plane there may be provided, e.g., a camera or another detection unit, or an eyepiece. Moreover, the microscopical imaging system comprises an adaptive optical element, which is arranged at the pupil plane between the objective-side component and the image-side component.

The adaptive optical element may be, for example, a membrane mirror or a spatial light modulator.

Thanks to the use of four lens groups—two on either side of the adaptive optical element at the pupil plane —, a pupil image that is at least achromatically corrected in longitudinal (axial) and transverse (lateral) directions can be ensured as well as an intermediate image of the object on the camera plane, this intermediate image also being at least achromatically corrected in longitudinal and transverse directions. The corrections can be achieved because several lens groups are used on both the objective and the image sides, and because of the combination of at least one positive power with at least one negative power lens element each in one or several of the lens groups.

To minimize the angle of incidence, the distance between the second objective-side lens group and the adaptive optical element as well as the distance between the adaptive optical element and the first image-side lens group must be as long as possible; typical distances are within a range of 50 mm and 200 mm. The distance between the intermediate image and the first objective-side lens group is between −100 mm and 100 mm, i.e., this lens group may be positioned in front of or behind the intermediate image. The distance between the second image-side lens group and the image plane, which in most cases corresponds to the camera plane, is between 20 mm and 100 mm. With a sufficiently negative selection of the distance between the intermediate image plane and the first objective-side lens group, say, in a range around −50 mm, and a selection of the distance between the second objective-side lens group and the adaptive optical element in a range around 100 mm, the relay length can be reduced by about 20% to 50% compared to a simple solution consisting of only one objective-side and one image-side lens element, this reduction making it possible, e.g., to introduce the relay optical system as a module into, and remove it from, the ray path.

In a preferred embodiment of the invention, the objective-side lens groups are, with regard to longitudinal and transverse chromatic aberrations of the tube lens system and/or of the objective as regards the transfer of the objective's exit pupil image to the pupil plane, adapted to be corrective at least up to a specified error signature, preferably to be completely compensating.

In addition or alternatively, the image-side lens groups may be adapted to correct longitudinal and transverse chromatic aberrations as regards the transfer of the sample image from the intermediate image plane to the image plane at least up to a specified error signature, preferably completely compensating the said aberrations.

These corrections are possible because the objective-side component and the image-side component of the relay optical system each comprise lens groups of several, at least two lens elements rather than single lens elements. By combining a lens element of positive power with a lens element of negative power, one obtains as a result a fictitious medium with an Abbe constant that can be controlled at will, depending on the glasses selected. If the compensation achieved is not complete, it is achieved at least to the extent that a specified error signature, i.e., a certain chromatic error signature for a class of objectives corresponding to a quality grade, is attained.

Thanks to the use of several lens groups both in the objective-side and in the image-side component, handling the longitudinal and transverse chromatic aberrations for pupil imaging on the one hand and object imaging on the other hand can be separated, so that these aberrations, separately for pupil imaging and object imaging, can be completely corrected, while at the same time the number of lens elements used remains within manageable limits; i.e., the technical effort required for the correction remains within a reasonable scope.

In a simple embodiment, one or several of the objective-side and/or image-side lens groups are designed as a cemented component each, which reduces the number of components to be adjusted, but also reduces the adjusting possibilities.

If the lens groups are not cemented components, or if additional lens elements are used, it is possible preferably to also correct aberrations occurring with the large field angles common in widefield microscopy, e.g. with field-of-view numbers exceeding 15 mm.

If the tube lens is already completely achromatized, the lens groups of the objective-side component have to correct the chromatic aberrations of the objective pupil only, which, as a rule, are very small; therefore, the said lens groups are also almost achromatized. In this case, effective Abbe constants with amounts greater than 150 have to be employed, which can be achieved with suitable cemented components or lens groups.

In another preferred embodiment, the relay optical system is arranged to be displaceable along the ray path. In this way, the relay optical system can be adapted to a locus-dependent objective pupil position. A focusing movement of the objective can also be compensated in this way. In either case, the position of the image plane remains unchanged. The transmission ratio is a function of the lateral magnification of the pupil. With an imaging scale of 1:1, objective-side and image-side components are moved in the same direction by the same amount. The movement of both components at the respective transmission ratio between them can be ensured by a suitable gearing or electronic means.

In another embodiment of the invention, the relay optical system with the adaptive optical element is designed to be rotationally symmetric about the optical axis. Here, the optical axis of the relay optical system is not in line with the position of the optical axis in the other parts of the imaging system: the image plane or camera and the tube lens system as well as the intermediate image plane are, in this case, arranged off center relative to the optical axis of the relay optical system, but centered on the optical axis of the respective partial system, i.e. camera or objective and tube lens system. In this way, the angles of incidence to the adaptive element can be further reduced, because the light reflected off the adaptive element need not be conducted past mechanical mountings. In this case, the incident light is reflected off the adaptive optical element in such a way that it is passed back through the same optical elements; the objective-side component then is of the same design as the image-side component, save that the rays pass the image-side component in the reverse order compared to the passing of the objective-side component. For this purpose, the lens elements are suitably dimensioned, so that the rays from the objective to the adaptive optical element first run through one half of each lens element and, on their way back, run through the respective other half of each lens element. Relative to the optical axis of the relay optical system, the objective and the tube lens system on the one hand and the image plane on the other hand are arranged so as to be off-center relative to the optical axis of the relay optical system including the adaptive optical element, and so as not to be overlapping each other. In lens elements of rotationally symmetric shape, then, either pupil correction or the object image must be created otherwise than with the relay optical system, once the optical axes are back in line with the tube optics, i.e., outside the relay optical system.

In the symmetric embodiment of the relay optical system just described, the light still has to strike the adaptive optical element at an angle different from zero in order to be directed from one part of the ray path into the other. If one uses the adaptive optical element for displacing the focus by impressing a spherical or parabolic curvature upon it, a field-dependent astigmatism will result. As the axes of symmetry of the relay optical system and of the adaptive optical element are identical, and as the astigmatism of a known optical system varies with its back focal length, a rotationally symmetric relay optical system can be designed in such a way that the astigmatism caused at the adaptive element is compensated by the relay optical system itself for a particular defocusing. In this way, the range in which sharp and clean focusing is possible by means of the adaptive element can be further expanded.

Other embodiments of the invention permit, in addition, pupil imaging to be adapted to different sizes of the objective pupil. For example, a first telescope may be arranged in the ray path in front of, and a second telescope behind the relay optical system. These telescopes can be designed to be exchangeable to permit adaptation to different objectives. The relay optical system need not necessarily be exchanged along with the telescopes. In case of a modular design, different relay systems can be provided for different objectives even without the use of telescopes; whenever the objective in the revolving nosepiece is changed, the relay system can be changed, for example in the way of a slide-in module inserted at an intermediate image interface. Preferably, the telescopes are achromatized. The first telescope is arranged so that the intermediate image is in the ray path of the telescope, thus only effecting a magnification of the intermediate image without changing the focus and pupil positions. The second telescope is arranged in the ray path between the image-side component of the relay optical system and the image plane.

Whereas the components just mentioned permit discrete adaptation to various pupil sizes, e.g., by exchanging the telescopes, it is also possible to design the telescopes as zoom telescopes having more than two lens elements, which are also achromatized and permit continuous adaptation of the pupil size to the objective pupils of various objectives.

Also, the relay optical system itself may be designed as a zoom optical system; in this case, though, the chromatic corrections of the pupil image or object image, respectively, have to be effected externally in optical systems arranged in front of or behind the zoom system. In this case, too, the adaptive optical element may be designed as a reflecting element, and the zoom system may be rotationally symmetric about the longitudinal axis, so that both the incident ray path and the exiting ray path are conducted through the same lens elements, though on different sides.

It is understood that the features mentioned before and those explained below are applicable not only in the combinations stated but also in other combinations or as stand-alone features without leaving the scope of the present invention.

BRIEF DESCRIPTION OF THE DRAWINGS

Below, the invention will be explained in more detail with reference to the accompanying exemplary drawings, which also show features essential to the invention, among others, and in which.

DETAILED DESCRIPTION OF THE DRAWINGS

Figure 1:
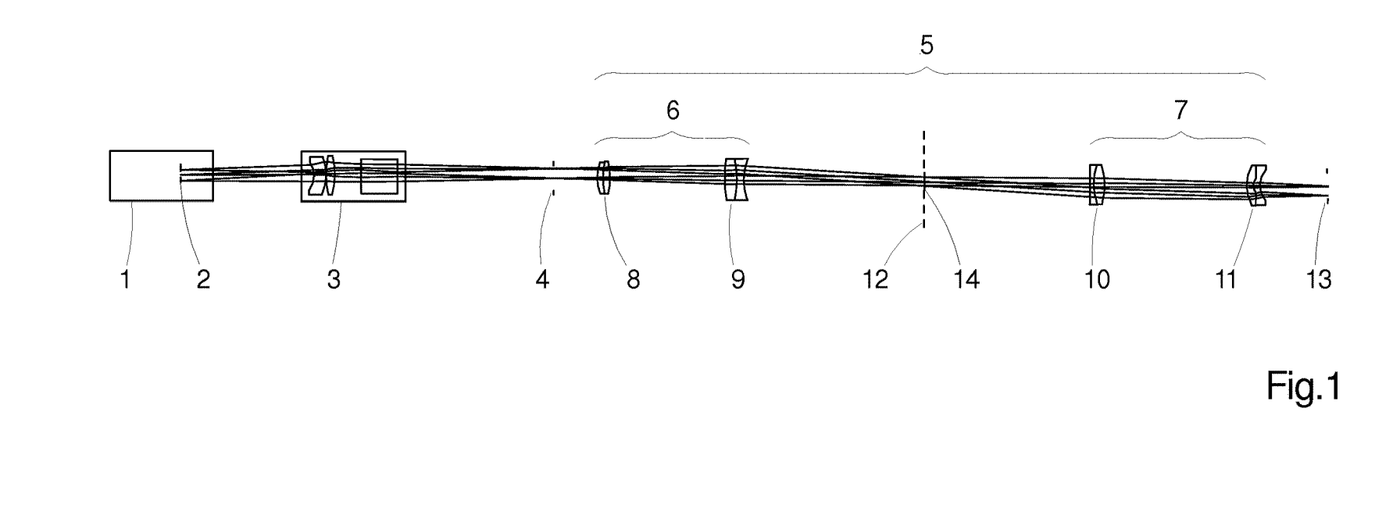
FIG. 1 shows a first embodiment of a microscopical imaging system.

FIG. 1 illustrates the basic design of the essential elements of a microscopical imaging system for the widefield microscopical imaging of a sample. At its left end and next to a sample that is not shown, the ray path shown in FIG. 1 exhibits first an objective 1. The objective 1 has an exit pupil 2 with a negative back focal length; i.e. the exit pupil 2 is virtually located inside the objective 1. Arranged behind the objective 1 as seen from the sample is a tube lens system 3, by means of which an image of the sample is formed on an intermediate image plane 4. Arranged behind the tube lens system 3 as seen from the sample is a relay optical system 5 with an objective-side component 6 and an image-side component 7. The objective-side component 6 comprises at least two lens groups, here a first objective-side lens group 8 and, at a distance from it, a second objective-side lens group 9. The image-side component 7 also comprises at least two lens groups, here a first image-side lens group 10 and, at a distance from it, a second image-side lens group 11. The relay optical system 5 is designed in such a way that it forms an image of the exit pupil 2 of the objective 1 on a pupil plane 12 situated between the objective-side component 6 and the image-side component 7 and, at the same time, transfers an image of the sample from the intermediate image plane 4 to an image plane 13. Arranged at the pupil plane 12 between the objective-side component 6 and the image-side component 7 is an adaptive optical element 14, which may be configured, e.g., as a spatial light modulator. In the present case shown in FIG. 1, it is transparent to light, but it may also be configured as a mirror, e.g., a membrane mirror. The adaptive optical element 14 is located at the pupil plane 12, a plane conjugate with the objective pupil, so that its effect is field-independent. The relay optical system 5 may be conceived in such a way that it can be inserted into the ray path as a module, e.g., coupled to an existing intermediate image interface. Then it can be exchanged to suit the objective used.

When forming an image of the objective pupil on the pupil plane, the first objective-side lens group 8 and the second objective-side lens group 9 correct longitudinal and transverse chromatic aberrations of the tube lens system 3 and of the objective 1 as regards the image of the exit pupil 2 of the objective 1 on the pupil plane 12. The correction is effected at least up to a specified error signature; preferably it compensates the two aberrations completely.

As a result of the pupil correction, i.e., the correction of the longitudinal and transverse aberrations of the tube lens system and of the objective 1, however, longitudinal and transverse chromatic aberrations will occur in the transfer of the intermediate image that has already been corrected by elements in the objective 1 and in the tube lens system 3. At the pupil plane 12, though, these aberrations do not get in the way of the field-independent manipulation in the present case. Therefore it is not necessary to effect correction already with the lens elements of the objective-side component 6, which would be a technically complex effort and require more lens elements.

Therefore, the correction of the longitudinal and transverse chromatic aberrations with regard to the transfer of the sample image from the intermediate image plane to the image plane is effected by the image-side lens groups 9 and 10. Here again, the error is preferably compensated completely, but at least corrected up to a specified error signature. In this way, especially the transverse chromatic aberration can be corrected, due to the color-dependent pupil position in the existing tube lens system 3.

Figure 2:
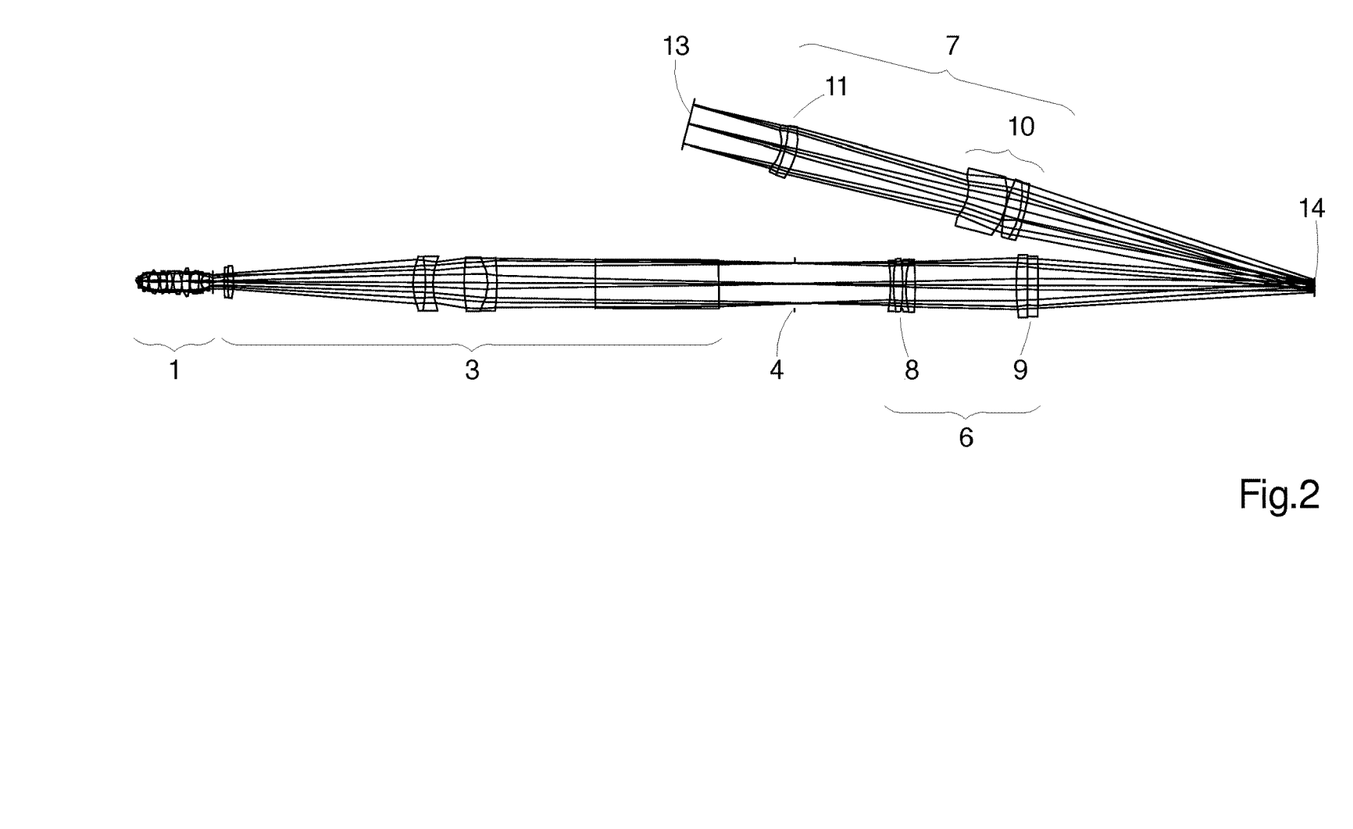
FIG. 2 shows a second embodiment of a microscopical imaging system.

In the embodiment shown in FIG. 1, the objective-side lens groups 8 and 9 and the image-side lens groups 10 and 11 are each designed as cemented components; in this way, effective media with almost any Abbe constants can be created. Here, the adaptive optical element 14 is shown as a transmitting element. Mostly, however, adaptive optical elements are operated in a reflecting mode, as this provides more possibilities of influencing the course of the ray path. Such an arrangement with a reflective adaptive optical element 14 is shown in FIG. 2. Here, the angle of incidence to the optical element 14, designed as a membrane mirror, is 7°. Here, the lens elements of the objective-side lens groups 8 and 9 and of the image-side lens groups 10 and 11 offer more degrees of freedom than two cemented components each would. In this way it is also possible to correct aberrations caused in case of large field angles.

Figure 3:
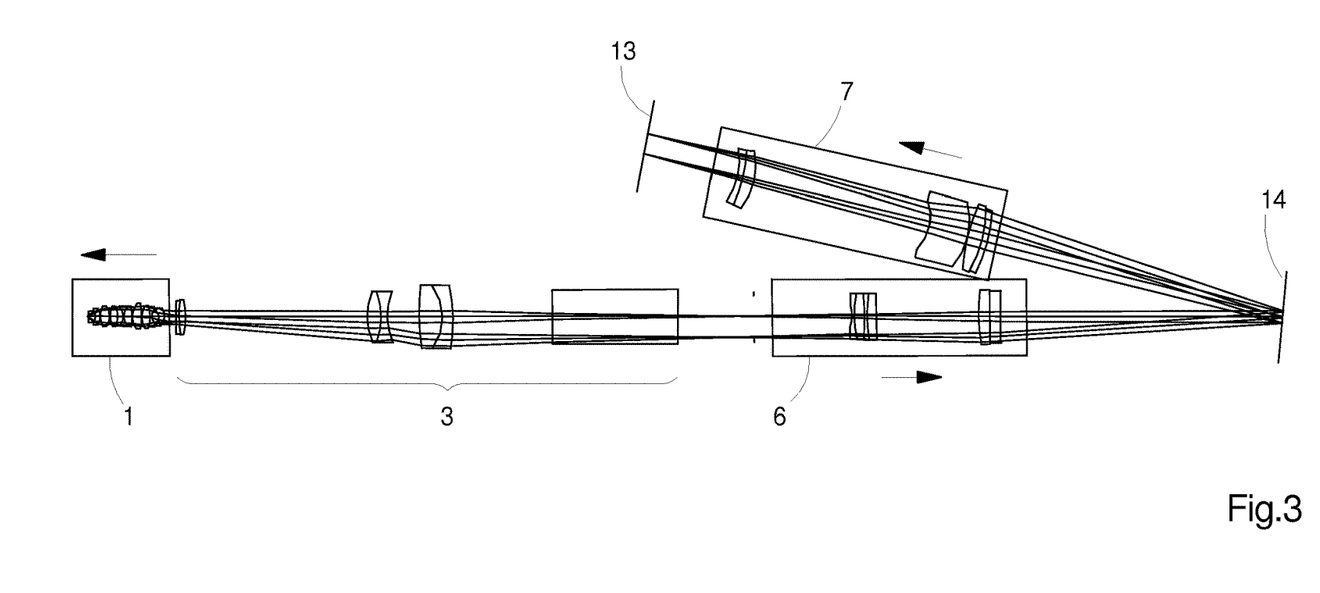
FIG. 3 shows a third embodiment of a microscopical imaging system with displaceable components.

FIG. 3 shows an embodiment of a microscopical imaging system in which the relay optical system 5 is arranged to be displaceable along the ray path. In this way, the position of the relay optical system 5 can be adapted to a variation of the objective pupil position. In this variation, the position of the image plane 13 remains constant. With an image at a scale of essentially 1:1, the image-side component 7 and the objective-side component 6 of the relay optical system 5 are displaced by the same amount and in the same direction if the position of the objective pupil is varied by displacing the objective 1, as indicated by the arrow. With suitable transmission gearing or by electronic means, a transmission ratio for the ratio between the movement of the objective 1 and the movement of the relay optical system 5 can be set, with the transmission ratio between the objective movement and the transfer system movement being a function of the pupil image scale. With an image at a scale of 1:1, both components are moved by equal amounts. As in the example shown by FIG. 3, the objective is moved, e.g., by 5 mm towards the sample; for adaptation to the new position of the objective pupil, the objective-side component 6 and the image-side component 7 of the relay optical system 5 are each moved by 6.2 mm towards the image plane 13, the position of which remains unchanged. The position of the adaptive optical element 14 is not changed either. Here, imaging is effected at a scale of 1:1. As, with a displacement of the position of the objective pupil, the longitudinal and transverse aberrations of the pupil and object images will be slightly varied, it may be of advantage here if one or several of the lens elements of the objective-side and image-side lens groups 8, 9, 10 and 11 can be displaced independently of the other lens elements or at a fixed ratio relative to their movement.

In another embodiment, the relay optical system 5 with the adaptive optical element 14 is designed to be axially rotationally symmetric about the optical axis of these elements, with both the ray path leading to the adaptive optical element 14 and the one leading away from it passing through the same lens elements of the relay optical system 5. In other words, the same lens groups are passed by the light twice: first when it passes towards the adaptive optical element 14, and again when it returns from the adaptive optical element 14. The ray paths themselves are decentered and do not overlap. In this way, the angles of incidence to the adaptive element can be further reduced, because the light reflected by the adaptive optical element 14 need not be directed past mechanical lens mounts but is returned into the same optics.

Figure 4A:
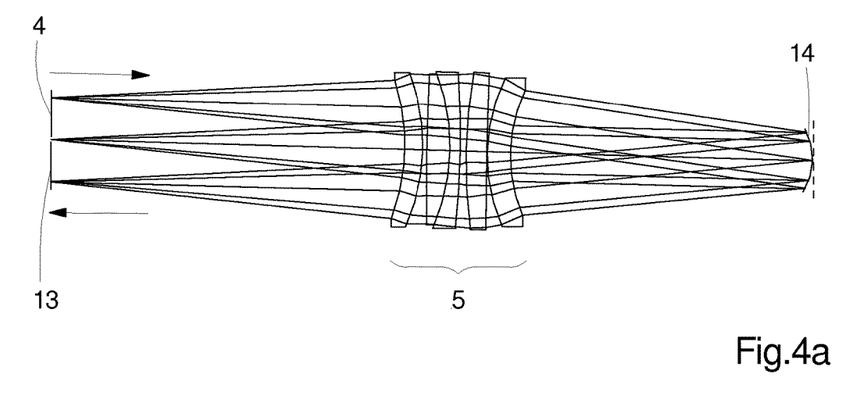
FIG. 4a shows a relay optical system of an axially rotationally symmetric design.
Figure 4B:
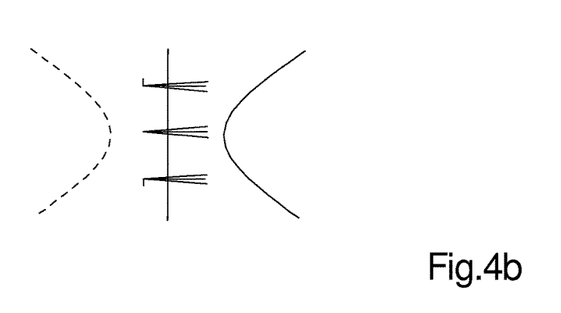
FIG. 4b shows the effect of an adaptive optical element in the ray path.

However, the decentered position of the optical axis of the tube lens system 3 relative to the optical axis of the relay optical system 5 does not enable color corrections according to the scheme described in connection with FIG. 1. Such a color correction must be effected before and behind the relay optical system 5 where the optical axis again coincides with that of the tube lens system 3 or that of the image plane 13, respectively. An example of such a system is shown in FIG. 4a. Light coming from the intermediate image 4 (left) is directed through the upper area (on the plane of the drawing) of the relay optical system 5 to an adaptive optical element 14 designed as a membrane mirror; from there it is transferred back to the image plane 13 through the lower area of the relay optical system 5. In its basic position (shown as a broken line in FIG. 4a), the adaptive optical element 14 is designed as a plane surface, so that the angle of incidence of light to the adaptive optical element 14 is slightly different from zero. However, the adaptive optical element 14 can be provided with a spherical or parabolic curvature, so that it can be used to displace the focus. In this connection, then, a field-dependent astigmatism will occur. As, however, the axes of symmetry of the relay optical system 5 and of the adaptive optical element 14 coincide, and as the astigmatism of a given optical system varies with the back focal length, a symmetric relay optical system 5 can be so designed that the astigmatism created at the adaptive element 14 can, for a certain defocusing, be compensated by the relay optical system 5. In this way, the focusing range addressable with the aid of the adaptive optical element can be increased. If the adaptive optical element 14 in FIG. 4a is implemented in its curved position, shown here with a solid line, it will create an astigmatism with a parabolic field dependence, namely, rotationally symmetric to the optical axis of the relay optical system 5 and of the adaptive element 14. This is shown in FIG. 4b by the solid line. The curvature of the membrane mirror is effected in proportion with the displacement of the focus. For a certain focus position or defocusing, respectively, the relay optical system 5 can be designed for the change in back focal length to create an astigmatism of the same amount but different sign. This is shown in FIG. 4b by the broken line (left). In sum, both effects cancel each other out; this is shown at the center of FIG. 4b by the solid line.

Figure 5A:
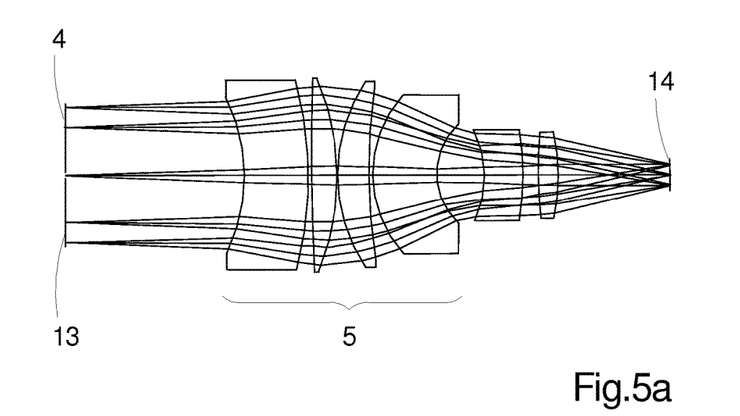
FIG. 5a shows another embodiment of a rotationally symmetric relay optical system in an initial position.
Figure 5B:
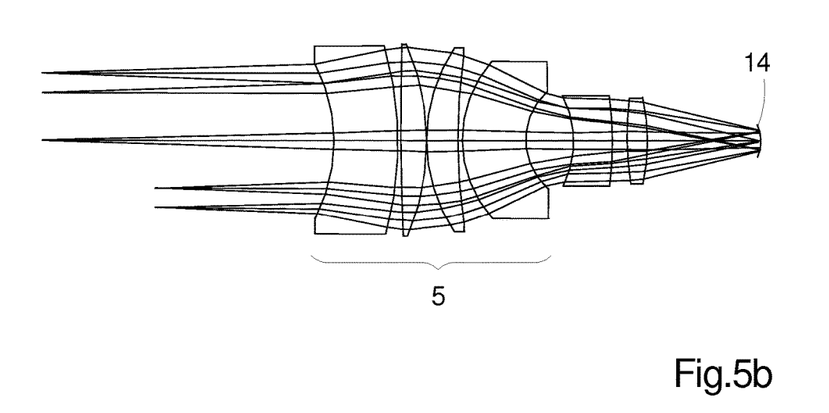
FIG. 5b shows the relay optical system of FIG. 5a in a working position.

The effect of this focus displacement is shown again in FIG. 5a and FIG. 5b. In FIG. 5a, the adaptive optical element is in its basic position; this essentially corresponds to the configuration shown in FIG. 4a with flat membrane mirrors. In FIG. 5b, the adaptive optical element 14 has a slight spherical curvature, which causes the focus displacement shown.

Figure 6:
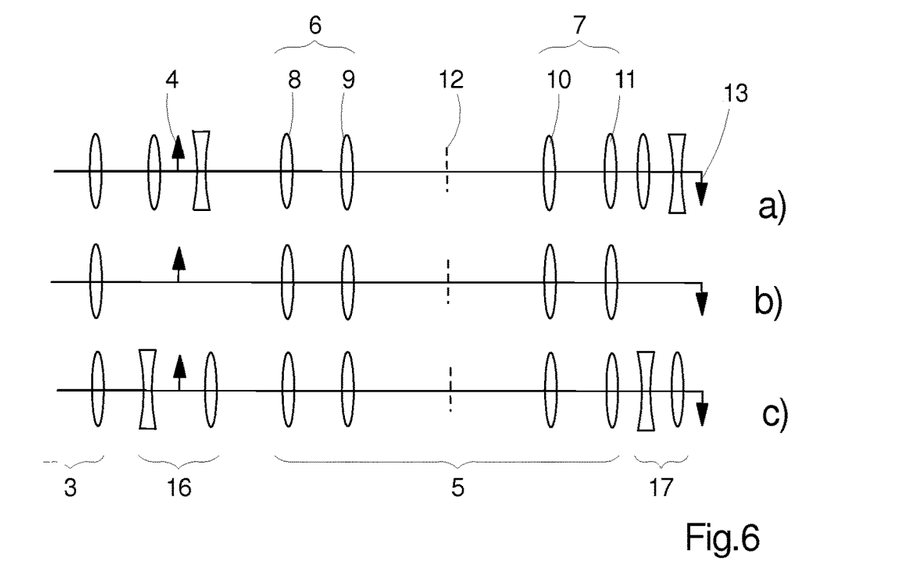
FIG. 6 shows a microscopical imaging system in which, in addition to the relay optical system; telescopes are exchangeably arranged in the ray path.

In further embodiments of the imaging system, pupil imaging can, in addition, be adapted to different sizes of the objective pupil. Suitable for discrete adaptation of the pupil size are, e.g., individual relay systems 5 for different objective pupils, which preferably have identical transfer lengths. Another possibility is to arrange, in the ray path of the imaging system, a first telescope 16 before the relay optical system 5 and a second telescope 17 behind it, as sketched in FIG. 6. Here, the elements shown as single lenses may also, and particularly so, represent lens groups, as it is the case, e.g., with the objective-side lens groups 8 and 9 and the image-side lens groups 10 and 11 of the relay optical system 5. The telescopes 16 and 17 may be designed to be exchangeable; for example, they may be arranged in a module. FIG. 6, for example, shows a module containing three configurations, viz. two configurations with various first telescopes 16 and various second telescopes 17 in FIGS. 6a and 6c, and one configuration without such telescopes in FIG. 6b. Here, the intermediate image plane 4 is located in the first telescope 16, so that the first telescope 16 is arranged at the intermediate image. The second telescope 17 is arranged before the image plane 13.

Figure 7:
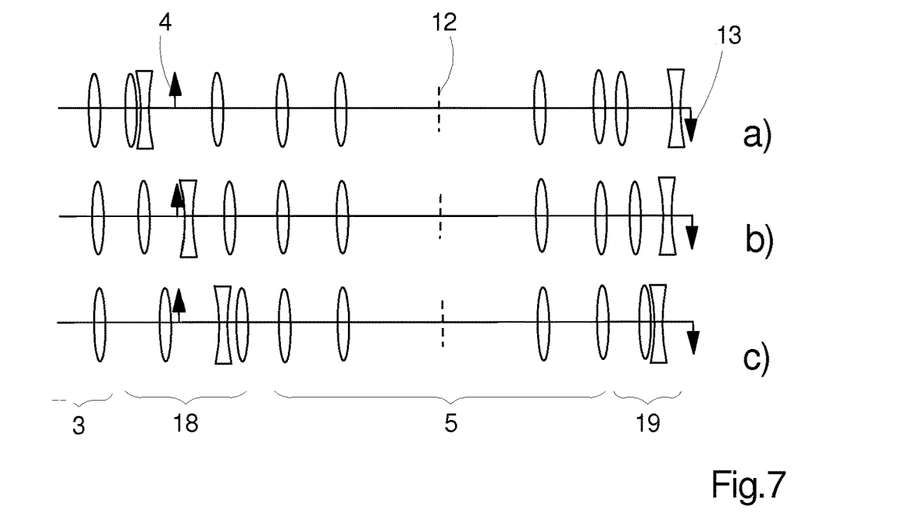
FIG. 7 shows a microscopical imaging system in which telescopes designed as zoom telescopes are arranged in the ray path.

Whereas such a module with exchangeable telescopes permits only a discrete adaptation to the pupil size, one can use a first zoom telescope 18 in place of the first telescope 16 a, and a second zoom telescope 19 in place of the second telescope 17. Such a configuration is shown in FIG. 7. FIGS. 7a, b and c show different positions of the two zoom telescopes 18 and 19.

Figure 8:
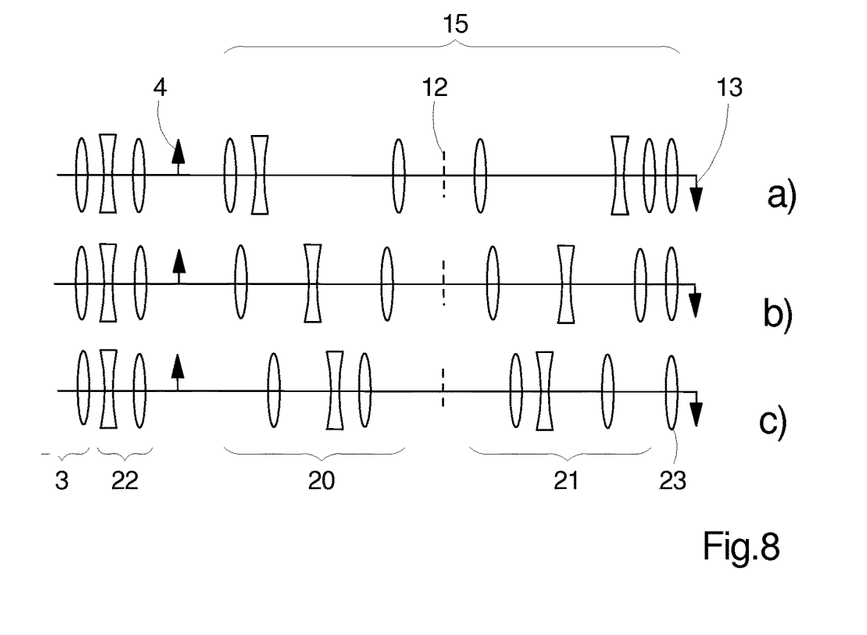
FIG. 8 shows an embodiment of a microscopical imaging system in which the relay optical system is designed as a zoom system.

In another embodiment, a relay optical system 15 is implemented by a zoom system with two zoom lenses, which then, however, cannot be used for correction of the chromatic aberrations as described in connection with FIG. 1. Such a relay optical system 5 with a first zoom lens 20 and a second zoom lens 21, which are arranged between the intermediate image plane 4 and the pupil plane 12 or between the pupil plane 12 and the image plane 13, respectively, is shown in FIG. 8, wherein FIGS. 8a, 8b and 8c show different positions of the zoom lenses. Also arranged in the ray path are corrective elements 22 and 23 for correcting the chromatic aberrations just mentioned.

Figure 9:
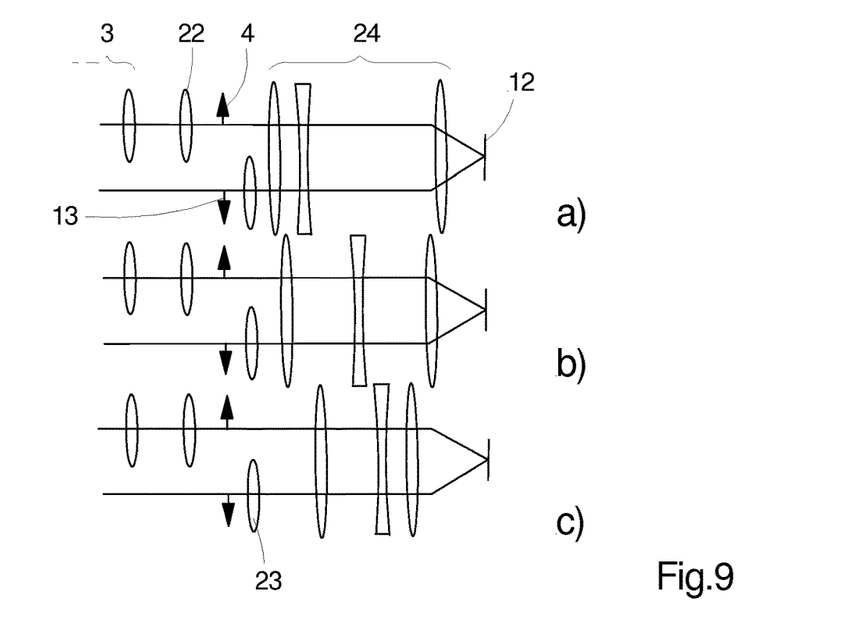
FIG. 9 shows an imaging system in which the zoom system is designed to be rotationally symmetric about an optical axis and in which the same lens elements are used for the incident and the exiting ray path.

The first zoom lens 20 and the second zoom lens 21 may be designed to be symmetric relative to the pupil plane 12, in which case they can also be combined in an axially symmetric configuration as already described in connection with FIG. 4 and FIG. 5. Such an axially symmetric zoom lens 24 is shown in FIG. 9 in different positions, which correspond to the positions shown in FIG. 8. In this case, the objective-side component 6 and the image-side component 7 of the relay optical system 15 are identical and are implemented by the zoom lens 24.

LIST OF REFERENCE NUMBERS 1 objective
2 exit pupil
3 tube lens system
4 intermediate image plane
5 relay optical system
6 objective-side component
7 image-side component
8 first objective-side lens group
9 second objective-side lens group
10 first image-side lens group
11 second image-side lens group
12 pupil plane
13 image plane
14 adaptive optical element
15 relay optical system
16 first telescope
17 second telescope
18 first zoom telescope
19 second zoom telescope
20 first zoom lens
21 second zoom lens
22 corrective element
23 corrective element
24 axially symmetric zoom lens

What is claimed is:

1. A microscopical imaging system for the widefield microscopical imaging of a sample, comprising:
   a ray path with an objective;
   a tube lens system arranged behind the objective as seen from the sample;
   a relay optical system with an objective-side component and an image-side component, wherein the objective-side component comprises at least a first objective-side lens group and, at a distance from the first objective-side lens group, a second objective-side lens group, wherein the image-side component comprises at least a first image-side lens group and, at a distance from the first image-side lens group, a second image-side lens group, and wherein the relay optical system images an exit pupil of the objective on a pupil plane between the objective-side component and the image-side component and transfers an image of the sample from an intermediate image plane to an image plane; and
   an adaptive optical element that is arranged at the pupil plane between the objective-side component and the image-side component.

2. The microscopical imaging system of claim 1, wherein the objective-side lens groups, as regards the imaging of the exit pupil of the objective on the pupil plane, are adapted to correct longitudinal and transverse chromatic aberrations of the tube lens system or of the objective at least up to a specified error signature.

3. The microscopical imaging system of claim 1, wherein the image-side lens groups, as regards the transfer of the sample image from the intermediate image plane to the image plane, are adapted to correct longitudinal and transverse chromatic aberrations at least up to a specified error signature.

4. The microscopical imaging system of claim 1, wherein at least one of the objective-side or the image-side lens groups are cemented components.

5. The microscopical imaging system of claim 1, wherein the relay optical system is displaceable along the ray path.

6. The microscopical imaging system of claim 5, wherein the objective-side component and the image-side component are displaceable independently of each other or at a specified transmission ratio between them.

7. The microscopical imaging system of claim 1, wherein, in the ray path, a first telescope is arranged preceding, and a second telescope is arranged following, the relay optical system.

8. The microscopical imaging system of claim 7, wherein the telescopes are adapted to be exchangeable.

9. The microscopical imaging system of claim 7, wherein the telescopes are zoom telescopes for varying the magnification.

10. The microscopical imaging system of claim 1, wherein the relay optical system with the adaptive optical element is rotationally symmetric about the optical axis and the optical axis is situated off-center relative to the tube lens system, the intermediate image plane and the image plane.

11. The microscopical imaging system of claim 10, wherein a spherical or parabolic curvature is impressable on the adaptive optical element, and wherein the relay optical system is adapted to correct an astigmatism combined therewith.

12. The microscopical imaging system of claim 1, wherein the relay optical system is a zoom system.

13. The microscopical imaging system of claim 12, wherein the adaptive optical element is a reflecting element and both the ray path leading to the adaptive optical element and the ray path leading away from it pass through the same lens elements of the zoom system.

14. The microscopical imaging system of claim 1, wherein the relay optical system is insertable into the ray path as a module.

15. The microscopical imaging system of claim 1, wherein the adaptive optical element is a membrane mirror or a spatial light modulator.

* * * * *

UNITED STATES PATENT AND TRADEMARK OFFICE
CERTIFICATE OF CORRECTION

PATENT NO. : 10,359,612 B2
APPLICATION NO. : 14/835008
DATED : July 23, 2019
INVENTOR(S) : Thomas Nobis et al.

Page 1 of 1

It is certified that error appears in the above-identified patent and that said Letters Patent is hereby corrected as shown below:

On the Title Page

At item (56), References Cited, U.S. PATENT DOCUMENTS Please insert therefor:
-- 5,959,772 A         09/1999      Yonezawa
2012/0307036 A1     12/2012      Yamamoto --.

Signed and Sealed this
Nineteenth Day of November, 2019

Andrei Iancu
*Director of the United States Patent and Trademark Office*